(12) United States Patent
Torkelsson et al.

(10) Patent No.: US 7,197,622 B2
(45) Date of Patent: Mar. 27, 2007

(54) EFFICIENT MAPPING OF SIGNAL ELEMENTS TO A LIMITED RANGE OF IDENTIFIERS

(75) Inventors: Kjell Torkelsson, Skarpnäck (SE); Lars-Orjan Kling, Södertälje (SE); Hákan Otto Ahl, Uppsala (SE); Johan Ditmar, Skarpnäck (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 265 days.

(21) Appl. No.: 10/450,827

(22) PCT Filed: Dec. 12, 2001

(86) PCT No.: PCT/SE01/02746

§ 371 (c)(1),
(2), (4) Date: Nov. 20, 2003

(87) PCT Pub. No.: WO02/51098

PCT Pub. Date: Jun. 27, 2002

(65) Prior Publication Data

US 2004/0221132 A1     Nov. 4, 2004

(30) Foreign Application Priority Data

Dec. 20, 2000   (SE) .................................... 0004736

(51) Int. Cl.
*G06F 12/00*   (2006.01)
(52) U.S. Cl. ...................................... 711/216
(58) Field of Classification Search ............ 711/3, 711/113, 207, 216, 218; 716/3; 370/389, 370/392; 341/51, 95, 67; 375/240
See application file for complete search history.

(56) References Cited

U.S. PATENT DOCUMENTS

| 4,558,302 | A | * | 12/1985 | Welch | .......................... 341/51 |
| 4,587,610 | A |   | 5/1986  | Rodman |  |
| 4,864,572 | A | * | 9/1989  | Rechen et al. | ............... 714/701 |
| 5,001,478 | A | * | 3/1991  | Nagy | .......................... 341/67 |
| 5,049,881 | A | * | 9/1991  | Gibson et al. | ................. 341/95 |

(Continued)

FOREIGN PATENT DOCUMENTS

EP     0522743 A1     1/1993

OTHER PUBLICATIONS

Donald Knuth, "The art of Computer Programming, vol. 3 Sorting and Searching", second edition 1998, Addison-Wesley, pp. 513-523.*

*Primary Examiner*—Pierre Bataille
*Assistant Examiner*—Paul Schlie
(74) *Attorney, Agent, or Firm*—Nixon & Vanderhye P.C.

(57) ABSTRACT

Signal elements are mapped to a limited range of identifiers by emulating a "virtual" space of identifiers larger than the real limited space of identifiers. The larger virtual identifier space is implemented by an intermediate memory, which provides storage of identifiers assigned from the real space of identifiers. For each signal element to be mapped to an identifier, the intermediate memory is addressed by a hash value calculated from at least part of the signal element, thus allowing access to an identifier. The larger virtual space gives a better distribution of signal elements to the identifiers; and reduces the probability of different signal elements being mapped to the same identifier ("clashing"). For an efficient reduction of the clashing probability, identifiers with a low probability of being active are assigned to the intermediate memory to represent new signal elements.

39 Claims, 12 Drawing Sheets

U.S. PATENT DOCUMENTS

| | | | |
|---|---|---|---|
| 5,131,016 A * | 7/1992 | Broughton et al. | 375/240 |
| 5,390,173 A * | 2/1995 | Spinney et al. | 370/393 |
| 5,414,704 A * | 5/1995 | Spinney | 370/389 |
| 5,477,537 A | 12/1995 | Dankert et al. | |
| 5,530,829 A * | 6/1996 | Beardsley et al. | 711/113 |
| 5,530,834 A * | 6/1996 | Colloff et al. | 711/136 |
| 5,530,958 A * | 6/1996 | Agarwal et al. | 711/3 |
| 5,592,392 A * | 1/1997 | Matheson et al. | 716/11 |
| 5,701,432 A * | 12/1997 | Wong et al. | 711/130 |
| 5,751,990 A * | 5/1998 | Krolak et al. | 711/207 |
| 5,754,819 A * | 5/1998 | Lynch et al. | 711/218 |
| 5,860,153 A * | 1/1999 | Matena et al. | 711/216 |
| 5,920,900 A | 7/1999 | Poole et al. | |
| 6,097,725 A | 8/2000 | Glaise et al. | |

* cited by examiner

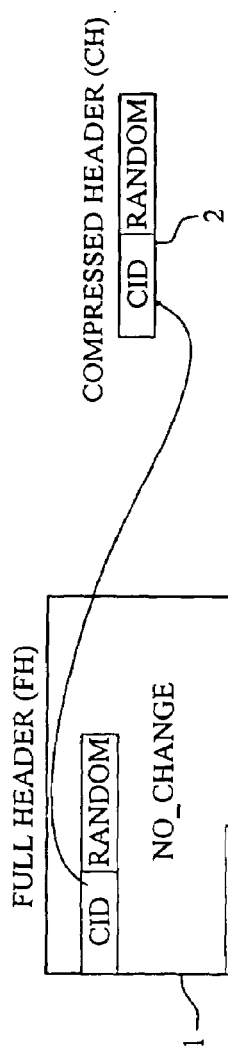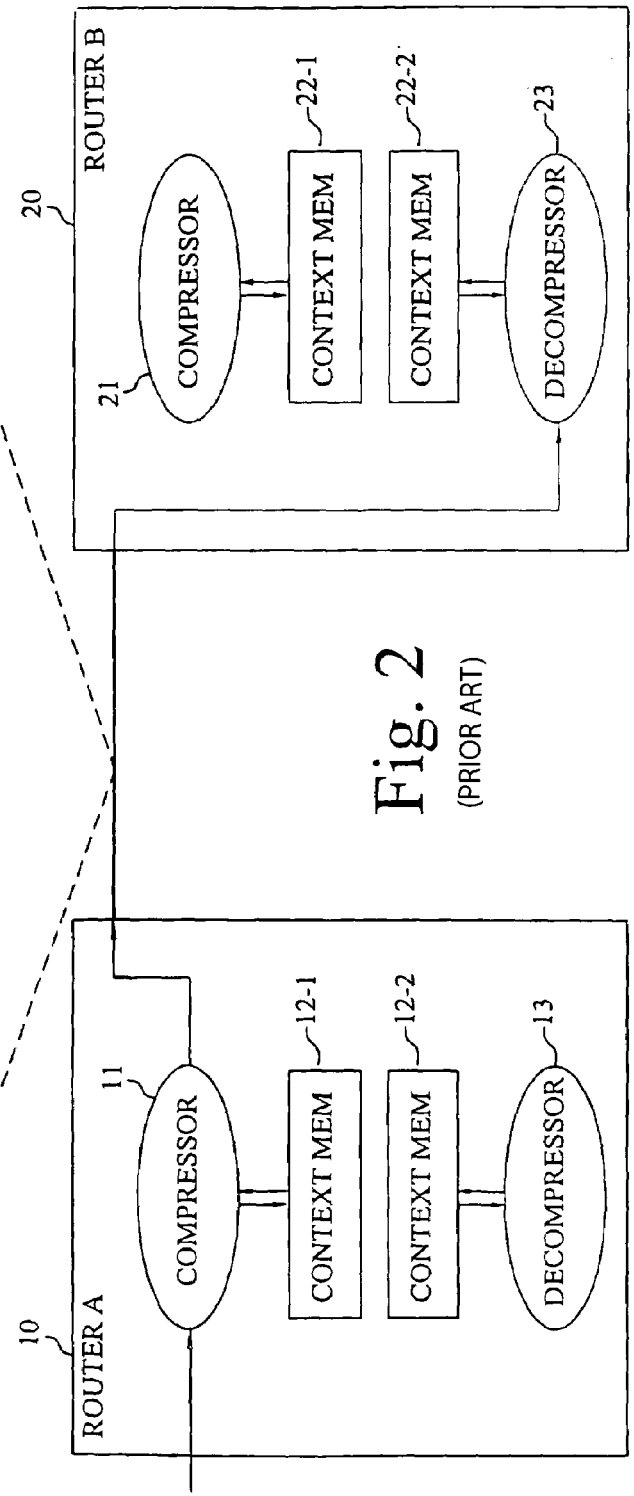
Fig. 1 (PRIOR ART)
Fig. 2 (PRIOR ART)

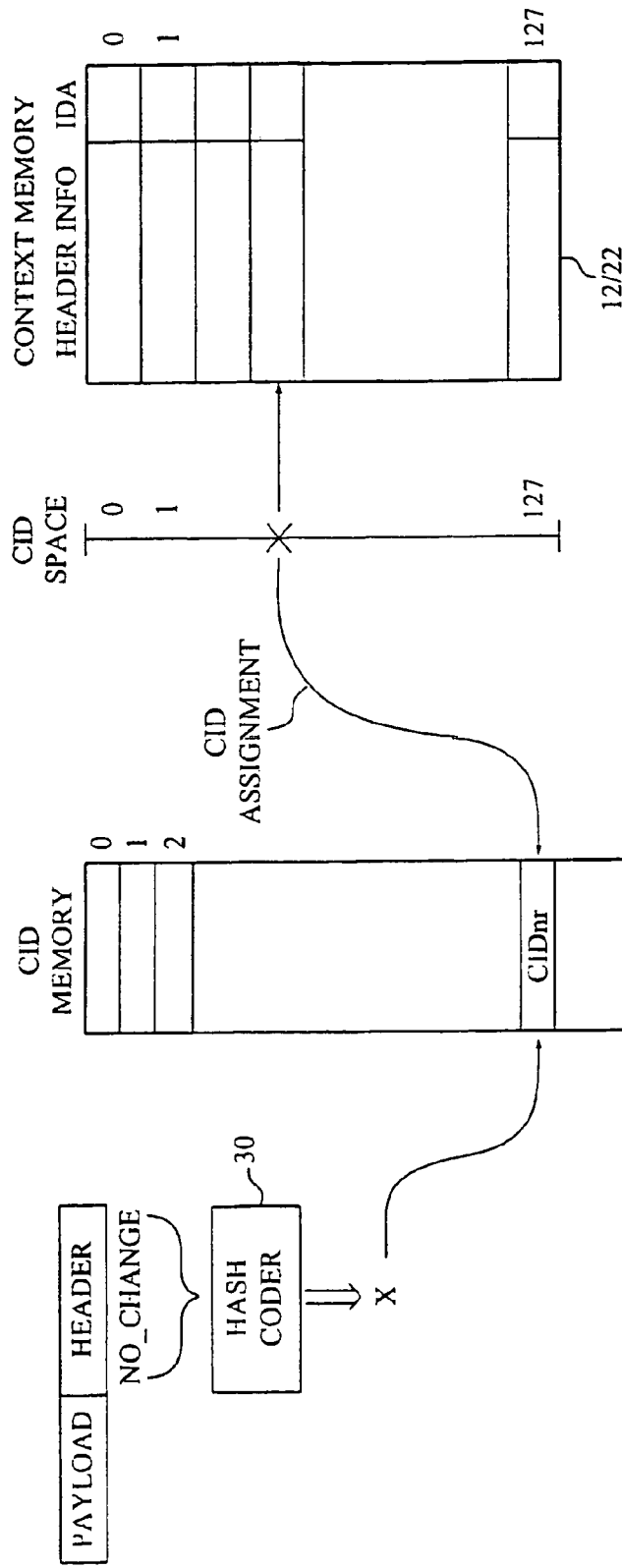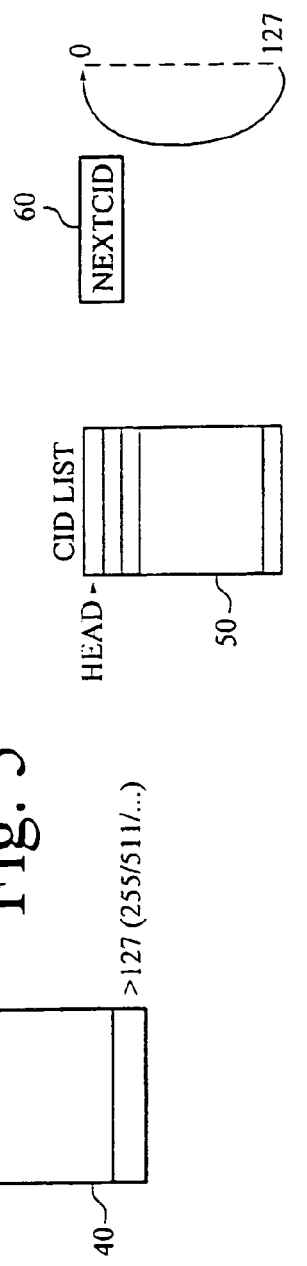
Fig. 5
Fig. 6A
Fig. 6B

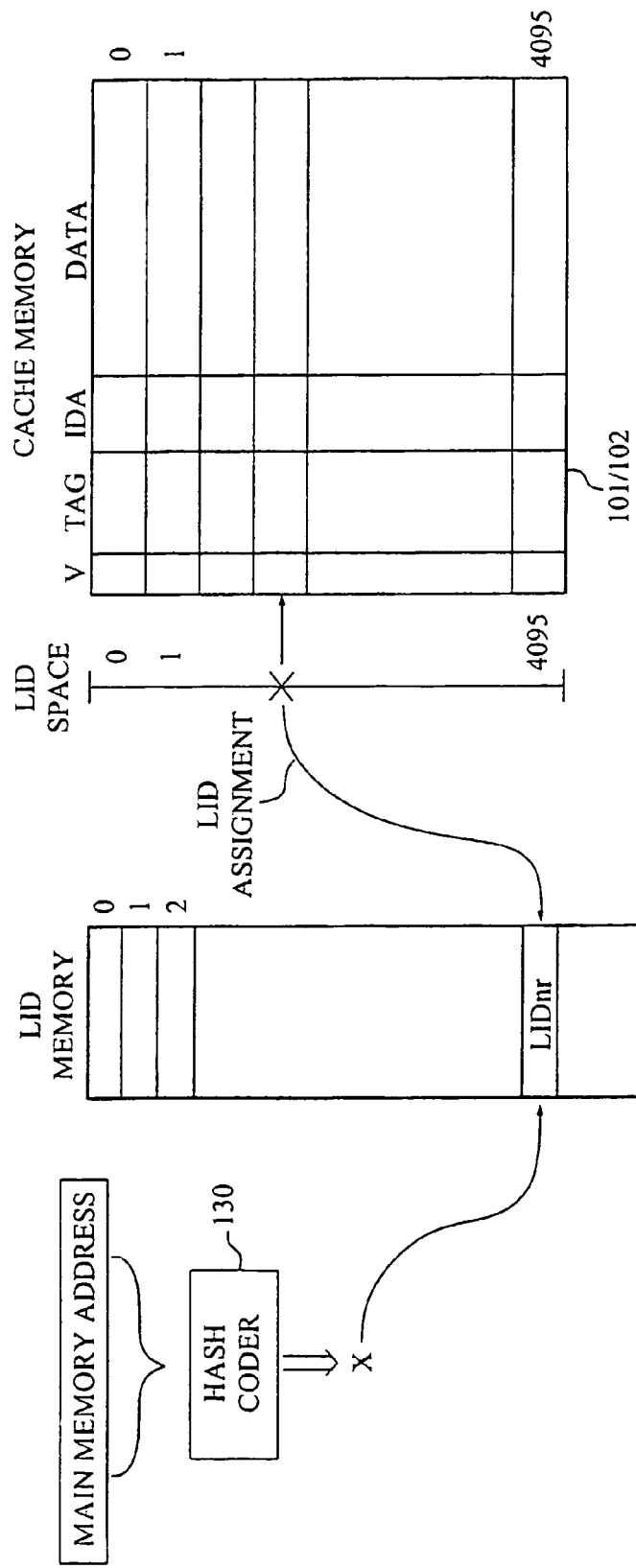
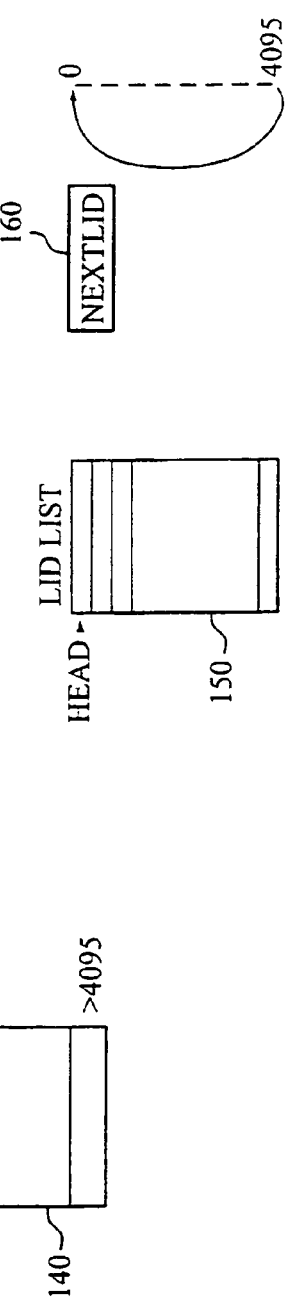
Fig. 11
Fig. 12A    Fig. 12B

EFFICIENT MAPPING OF SIGNAL ELEMENTS TO A LIMITED RANGE OF IDENTIFIERS

This application is the U.S. national phase of international application PCT/SE01/02746 filed 12 Dec. 2001, which designated the U.S.

TECHNICAL FIELD OF THE INVENTION

The present invention generally concerns the mapping of signal elements to a limited range of identifiers by means of hashing, and especially the selection of context identifiers to represent packet headers in Internet Protocol header compression, as well as cache mapping in computer systems.

BACKGROUND OF THE INVENTION

Hashing is a conventional technique commonly used in various applications for mapping a set of signal elements (arguments) to a limited range of numeric identifiers (keys) by means of a hash function. In hashing, a given signal element is mapped to an identifier based only on the signal element or appropriate parts thereof as input to the hash function, without any knowledge of the mapping between other signal elements and identifiers. Ideally, signal elements having the same content should be mapped to the same identifier, whereas signal elements of different contents should be mapped to different identifiers. However, hash functions are usually not capable of mapping all unique signal elements to distinct identifiers, and there is a considerable risk of different elements being mapped to the same identifier (a hash collision, also referred to as a clash).

Therefore, a lot of research has been directed towards finding optimized hash functions with random and uniform distribution characteristics. However, the number of hash collisions is usually still considerable in many applications even though a "good" hash function is used. In many cases the number of hash collisions may be considerable even when the number of unique and simultaneously active signal elements to be mapped to the identifiers is as low as 30–40% of the total number of identifiers.

Other attempts for reducing hash collisions include resolving the collisions by means of various complicated circuitry, for example as described in U.S. Pat. No. 5,920,900.

U.S. Pat. No. 6,097,725 describes a method for searching a bit field address in an ATM system by computing a hash key for pointing to a first address among a large number of addresses followed by sequential reading of a smaller number of subsequent entries until a match occurs.

For a more thorough understanding of conventional hashing and the problems associated therewith, hashing will now be described with reference to the particular problem of selecting context identifiers in Internet Protocol (IP) header compression.

IP header compression reduces the negative impacts of large IP headers significantly and allows efficient bandwidth utilization. Header compression is generally based on the observation that in a packet stream, most header fields are identical in consecutive packets. For simplicity one may think of a packet stream, sometimes also referred to as a session, as all the packets sent from a particular source address and port to a particular destination address and port using the same transport protocol. A basic principle for compressing headers is to establish an association between the non-changing fields of the headers in a packet stream and a context identifier (CID), which is selected to represent the headers. Headers are then replaced by compressed headers, each of which contains CID information and possibly also information that is unique to the individual packet header.

FIG. 1 is a schematic diagram illustrating a full header 1 with CID association as well as a corresponding compressed header 2. Typically, the header fields can be categorized into different categories depending on how the fields are expected to change between consecutive headers in a packet stream. Header compression standards such as RFC 2507 and RFC 2508 of the Internet Engineering Task Force provide such a classification for IPv6 base and extension headers, IPv4, TCP and UDP headers. In these standards, fields that are not expected to change are classified as NO_CHANGE, fields that can be inferred from other fields are classified as INFERRED, and fields that change in an unpredictable manner are classified as RANDOM. Information in RANDOM fields is normally included in the compressed headers, whereas information in INFERRED fields really does not have to be included in the compressed headers.

FIG. 2 is a schematic diagram of two interconnected routers A and B, each with header compression/decompression capabilities. The routers 10, 20 are interconnected by one or more (bi-directional) links. Each router comprises a compressor 11/21 and a decompressor 13/23, each of which is connected to a respective context memory 12-1, 12-2/22-1, 22-2. To compress the headers of a packet stream, the compressor 11 in router A selects, for each packet header, a CID to represent the non-changing fields of the header and stores header information, possibly together with additional information, as a compression context in the context memory 12-1 of router A. The initial packet of the packet stream is transmitted with a full header (FH), including the selected CID, over a given link to router B, allowing the decompressor 23 of router B to extract the compression context and the CID. The extracted compression context is stored in the context memory 22-2 of router B. Subsequent packets belonging to the same packet stream are then transmitted with compressed headers (CH) to router B. The decompressor 23 of router B can use the corresponding CID values to lookup the appropriate compression context in the context memory 22-2 of router B, thus restoring the compressed headers to their original form. In order to alleviate problems with incorrect decompression, full headers are typically transmitted periodically, or with an exponentially increasing interval in slow-start mode, to refresh the compression context.

Although many aspects of header compression are specified in detail in existing header compression standards, the CID selection mechanism is not. The maximum range of CID values is specified in the standards. TCP packets and non-TCP packets normally use separate sets of CID values with different maximum ranges. Different routers have to negotiate on which CID range to use before initiating transmission. In general, different links also use separate sets of CID values. The actual mechanism for generating and selecting CID values, however, is unspecified.

There are some basic requirements on CID generation and selection. The CID values should be unique for all packet streams that are active on a given link at any given time so that different streams are mapped to different CID values. If two or more active packet streams map to the same CID (clashing), the degree of compression is reduced since each clash requires a new full header, redefining the context of the CID, to be transmitted instead of a compressed header.

Generating a unique CID for each new packet stream is therefore very important for the overall efficiency of the compression algorithm.

CID selection is also complicated by the fact that there is no mechanism for determining when a stream has terminated.

Conventional methods for generating CID values are typically based on hashing, taking the non-changing header fields as input to a hash function to generate a corresponding CID value.

In header compression applications, the total number of possible headers may be extremely large, while typically the CID range is maximized to $2^8$ for TCP traffic and $2^{16}$ for non-TCP traffic.

FIG. 3 illustrates hash-based generation of CID values for addressing a context memory according to the prior art. For an incoming packet, the header fields classified as NO_CHANGE are used as input to a hash coder 30. A suitable hash function is implemented in the hash coder 30 to generate a CID value based on the given input. The generated CID value acts as an index to the context memory 12/22 and points to a specific address in the context memory to be used for storing corresponding header information as compression context. The context memory 12/22 has a limited size, here illustrated with 128 memory positions from 0 to 127. The corresponding CID values that are used for addressing the context memory define a CID space ranging from 0 to 127 (the CID range being equal to 128).

FIG. 4 illustrates the problem of CID clashing as two packet streams map to the same CID value. If a first packet belonging to stream X is mapped to the CID value 120 in the CID space, the corresponding header is stored as compression context in position 120 of the context memory. When a subsequent packet belonging to another stream Y also is mapped to the CID value 120, we have a CID clash. When the clash occurs, the CID value 120 is redefined to represent the new stream Y and the compression context previously stored in memory position 120 is overwritten by the header of the new packet belonging to stream Y. In the overall header compression scheme, this also means that the full header of the new packet of stream Y has to be transmitted to the decompressor on the receiving side. The two packet streams X and Y will continue to clash during the entire time period in which both packet streams are active, alternately overwriting each others compression contexts and necessitating the transmission of full header packets. In conventional hash-based CID generation, clashes will be common even when the number of simultaneously active sessions is relatively small compared to the total CID range, leading to a significant reduction of the compression efficiency.

In computer systems using cache memories, a similar problem is encountered when several memory addresses are mapped to the same cache line.

SUMMARY OF THE INVENTION

The present invention overcomes these and other drawbacks of the prior art arrangements.

It is a general object of the present invention to provide a hash-based mechanism for efficiently mapping a set of signal elements to a limited range of identifiers. In particular, it is desirable to reduce the number of hash collisions, also known as clashes. In this regard, it is a particular object of the invention to provide a method and system for mapping signal elements to a limited range of identifiers with a low probability of clashing.

Still another object of the invention is to find a cost-effective realization of relatively low complexity for efficient mapping of signal elements to a limited range of identifiers.

Another object of the invention is to improve the compression rate in IP header compression to allow better utilization of available bandwidth, especially for links of low and medium speed. In this respect, it is a particular object to find an improved CID allocation scheme. It is also an object of the invention to provide a method and system for efficient mapping of different packet streams to a limited range of CID identifiers with a low probability of CID clashes.

Still another object of the invention is to improve cache mapping in computer systems, and to devise an efficient cache placement algorithm.

These and other objects are met by the invention as defined by the accompanying patent claims.

The general idea according to the invention is to emulate a "virtual" space of identifiers that is larger than the real space of identifiers. The larger virtual identifier space is generally implemented by an intermediate memory, which provides storage for identifiers assigned from the real space of identifiers. For each signal element to be mapped to an identifier, the intermediate memory is addressed by means of a larger hash value calculated from at least part of the signal element, thus allowing access to an identifier.

The larger virtual space gives a better distribution of signal elements to the identifiers, and is a key feature for reducing the probability of different signal elements being mapped to the same identifier (clashing). If the intermediate memory has a range that is a factor $f$ larger than the real space of identifiers and the identifiers are assigned from the real identifier space to the relevant positions in the intermediate memory in an efficient manner, the effect will be essentially the same as if the real space of identifiers was $f$ times larger.

In those cases when a perfect hash function can not be found, it is necessary to detect and handle clashes in the extended virtual space of identifiers to prevent the algorithm according to the invention from degenerating. A clash between a new signal element and another previously mapped signal element can be detected by comparing the hash value for the new signal element with the hash value associated with the already mapped signal element. If they match, the two signal elements map to the same identifier, and a clash is detected. In the case of a clash, the identifier will be reused for the new signal element. This corresponds to the way clashes are handled in conventional algorithms based on direct hashing to the real space of identifiers. This does not reduce the value of the algorithm according to the invention since clashes occur much more seldom in the extended virtual space.

In particular, the invention is applicable to IP header compression and the mapping of packet streams to a limited range of context identifiers (CIDs). By means of an extended virtual CID space in which CID values are assigned from the real CID space, the risk for packet headers of different packet streams being mapped to the same context identifier can be reduced significantly. This in turn leads to improved utilization of the available bandwidth of the links used for transmitting the header compressed packet streams.

When assigning a CID value to a new session, it is important that the CID value has a low probability of belonging to an already active session. Ideally, the utilization of the CIDs is monitored and the CID that has been inactive for the longest period of time, i.e. the least recently used CID, is assigned to the new session.

Alternatively, by cyclically assigning CID values within the real range of context identifiers to new sessions, the "oldest assigned" CID is always selected for a new session. When the lifetimes of the sessions are more or less the same, there is a low probability that the oldest assigned CID is still active and hence this CID is a good candidate. The oldest assigned algorithm has turned out to provide a very cost-effective realization of relatively low complexity. Only a minimum of extra resources needs to be added to the already existing equipment for hash-based header compression.

The invention is generally applicable to hashing problems, and can also be utilized to improve e.g. hash-based cache mapping in computer systems.

The invention offers the following advantages:
Efficient mapping with reduced probability of clashing;
Cost-effective realization of low complexity;
Improved compression rate in IP header compression, thus allowing better utilization of available bandwidth;
Improved cache mapping in computer systems; and
Possibility to reduce the size of a context or cache memory, while still maintaining the same clashing probability.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which:

FIG. 1 is a schematic diagram illustrating a full header with CID association as well as a corresponding compressed header;

FIG. 2 is a schematic diagram of two interconnected routers A and B, each with header compression/decompression capabilities;

FIG. 5 is a schematic diagram illustrating a CID selection mechanism according to a preferred embodiment of the invention;

FIG. 6A is a schematic diagram illustrating a basic "least recently used" algorithm for assigning CID values to the virtual CID space by using a sorted list;

FIG. 6B is a schematic diagram illustrating a basic "oldest assigned" algorithm for cyclically assigning CID values to the virtual CID space using a NEXT CID register;

FIG. 11 is a schematic diagram illustrating a cache line selection mechanism according to a preferred embodiment of the invention;

FIG. 12A is a schematic diagram illustrating a basic "least recently used" algorithm for assigning cache line identifier (LID) values to the virtual LID space by using a sorted list;

FIG. 12B is a schematic diagram illustrating a basic "oldest assigned" algorithm for cyclically assigning LID values to the virtual LID space using a NEXT LID register;

DETAILED DESCRIPTION OF EMBODIMENTS OF THE INVENTION

Figure 3:
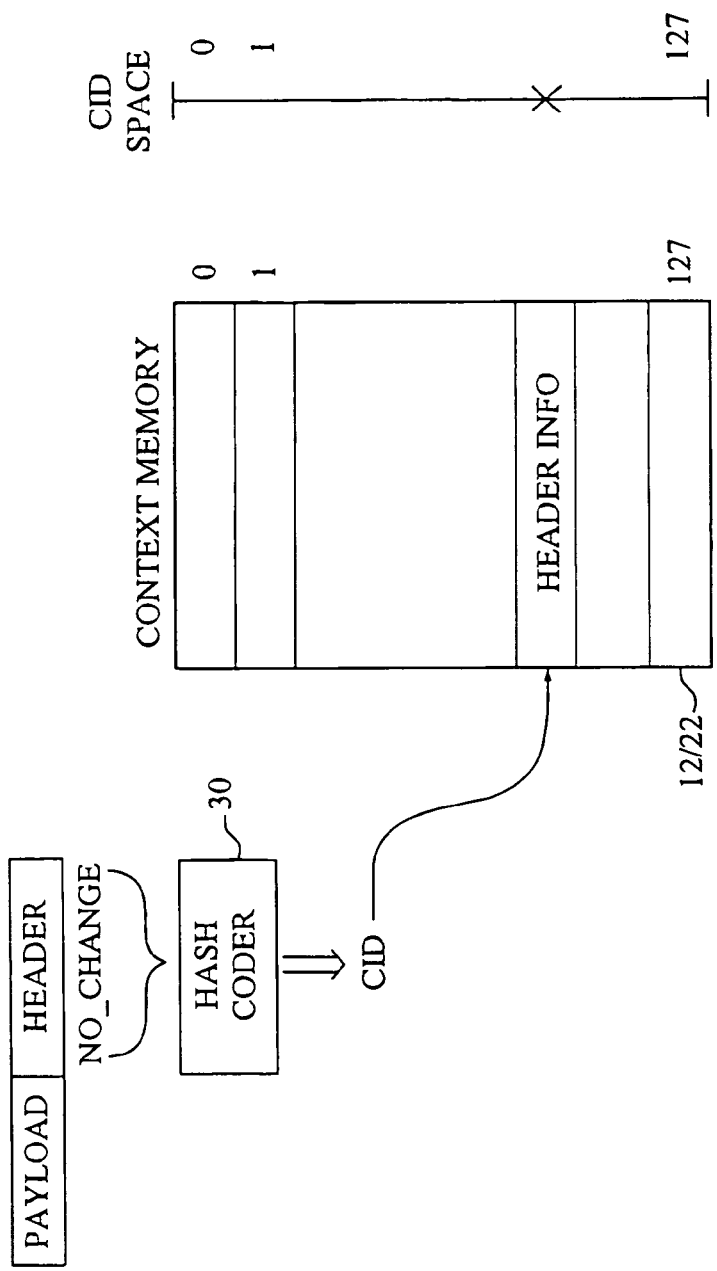
FIG. 3 is a schematic diagram illustrating hash-based generation of CID values for addressing a context memory according to the prior art.
Figure 4:
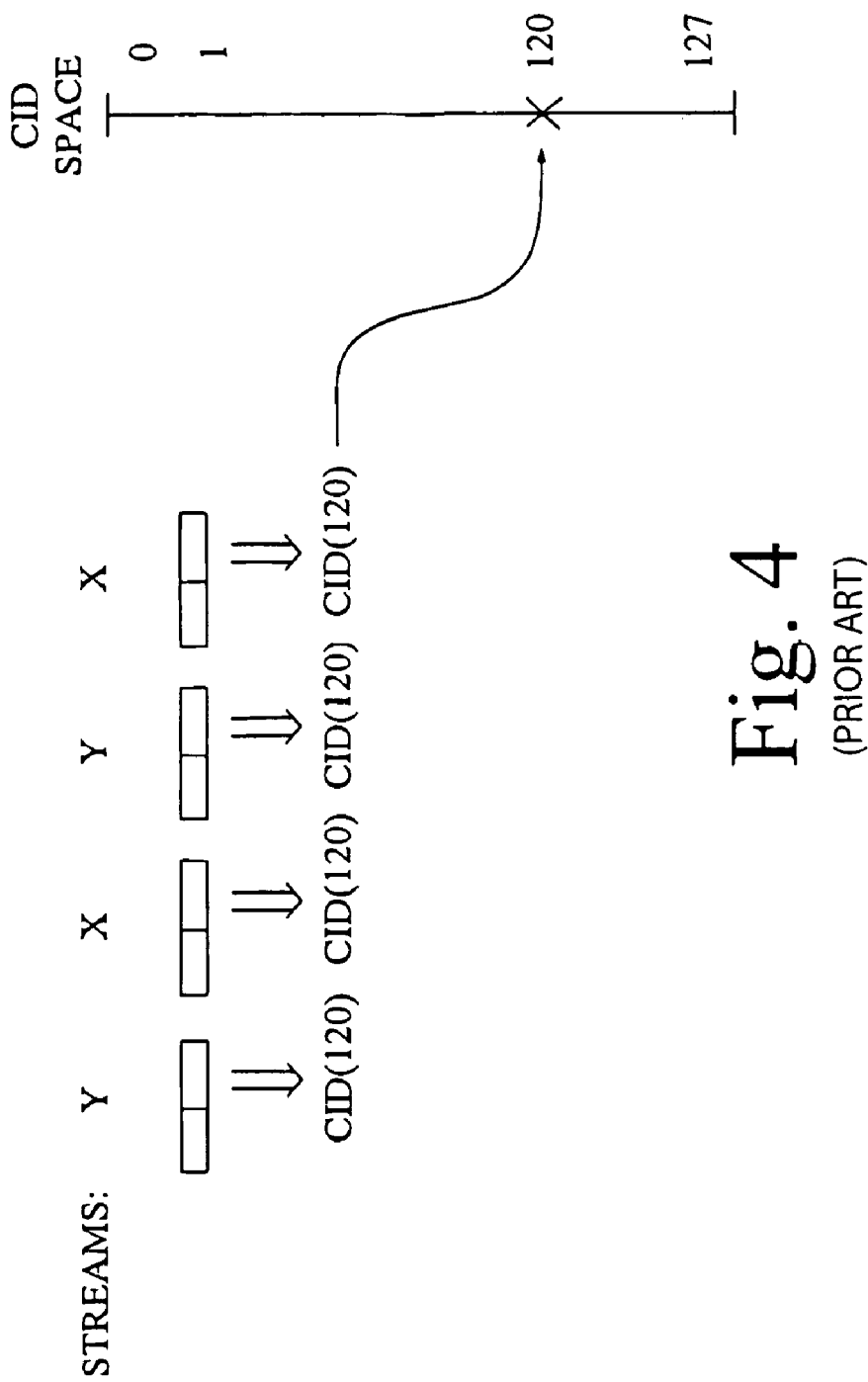
FIG. 4 is a schematic diagram illustrating the problem of CID clashing as two packet streams map to the same CID value.

Throughout the drawings, the same reference characters will be used for corresponding or similar elements.

The general mechanism for mapping a set of signal elements to a limited range of identifiers will first be described with reference to the particular application of CID selection in IP header compression. Next, the invention will be described with reference to cache mapping in a computer system. It should though be understood that the invention is not limited thereto, and that the invention can be applied to other hashing problems as well.

Emulating a Larger Virtual CID Space in IP Header Compression

FIG. 5 is a schematic diagram illustrating a CID selection mechanism according to a preferred embodiment of the invention. In the following example, it is assumed that a compressor is associated with a context memory 12/22 of a limited size, say 128 memory positions ranging from 0 to 127. The corresponding CID values 0 to 127 for addressing the context memory define a CID space having a limited range of 128. In clear contrast to the conventional CID generation based on direct hashing, the CID selection/generation mechanism according to the invention is based on an intermediate CID memory 40 of a range that is larger than the CID range. The intermediate CID memory 40 provides storage of CID values assigned from the real CID space, thereby emulating a larger virtual space of CID values. The virtual CID space is a factor f larger than the real CID space, where $f$ is any real value larger than 1. In practice, it is convenient to use $f$ values that are powers of 2, resulting in possible virtual CID ranges of 256, 512, 1024, . . . for a real CID range of 128. Of course, other virtual CID ranges are also feasible.

Now, a hash coder 30 or any other equivalent module for implementing a suitable hash function calculates a hash value X, preferably based on the NO_CHANGE fields of an incoming packet header. The calculated hash value X is used for addressing the intermediate CID memory 40 to get access to a CID. For example, the hash value X may be calculated using a standard 16-bit CRC and selecting a suitable number of output bits as the hash value. Of course, alternative hash functions may be used. Compared to direct hashing from a packet header to a CID value, the range of the hash values X used for addressing the intermediate CID memory 40 has to be larger than that of the CID values. This means that if the intermediate CID memory 40 has a range that is a factor $f=2^3$ times larger than the real CID range, the hash values X are preferably 3 bits longer than the CID values.

As mentioned above, the intermediate CD memory 40 provides storage of CID values assigned from the real CID space, allowing access to a CID when the CID memory is addressed by a hash value X. The accessed CID can then be used as an address to access the context memory 12/22. Assuming that CID values are assigned from the real CID space to the intermediate memory 40 to represent packet headers and corresponding packet streams in an efficient manner, the extended virtual CID space gives essentially the same effect as an $f$ times larger real CID space.

In the prior art, a reduction of the clashing probability can be obtained only by enlarging the real CID space, resulting in a larger context memory. The invention accomplishes the reduction of the clashing probability by using only an intermediate CID memory, without enlarging the context memory. Since the overall context memory is adapted for storing compression contexts in the form of large headers, enlarging the context memory will require much more extra memory than just adding an intermediate memory for storing relatively small CID values.

Naturally, the invention can also be used for reducing the size of the context memory while maintaining the same clashing probability (instead of reducing the clashing probability without enlarging the context memory). This gives the router designer a higher degree of design freedom, making it possible to choose between smaller context memories on one hand and reduced clashing probability on the other. In fact, it is even possible to reduce the size of the context memory and reduce the clashing probability at the same time by using a smaller real CID range and selecting an appropriately larger factor $f$.

Handling Real Clashes in the Extended Virtual CID Space

To prevent the proposed CID selection mechanism based on an extended virtual CID space from degenerating when there is a real clash in the extended virtual CID space, each hash value is preferably stored in relation to the corresponding header context in a special Identifier Address (IDA) field in the context memory 12/22 and compared to the hash value X leading to the clash. If they match, the CID is reused for the packet belonging to the new stream and the context is updated, including updating the IDA field, also referred to as the CID address field. This is consistent with using a real larger CID space with direct hashing and does not reduce the value of the algorithm according to the invention.

However, it should be understood that for certain applications when a perfect hash function can be found, there is generally no need for the CID address field and the associated hash value comparison.

Assigning CID Values with a Low Probability of Being Active

With regard to the assignment of CID values from the real CID space to the intermediate CID memory, it is important that a CID to be assigned to a new packet stream has a low probability of already belonging to an active packet stream. In this respect, the invention proposes two main schemes for CID assignment, although other schemes also are possible.

The "Least Recently Used" Algorithm for Assigning CID Values

Ideally, the CTD that has been inactive during the longest period of time should be selected and used for a packet belonging to a new packet stream. According to a preferred embodiment of the invention, illustrated schematically in FIG. 6A, this is accomplished by maintaining a sorted list 50 in which CID values within the real CID range are arranged according to their use for representing packet streams. Preferably, the most recently used context identifiers are placed at the end of the list, and consequently the least recently used CID can be found at the head of the list. The least recently used CID, which is the CID that has been inactive for the longest period of time, is the best candidate to use when a new CID is to be assigned. In hardware, the realization of the "least recently used" algorithm for assigning CID values to the virtual CID space becomes quite complex. Therefore this algorithm is more suitable for implementation in software, preferably by means of the linked list concept.

The "Oldest Assigned" Algorithm for Assigning CID Values

Another scheme, illustrated schematically in FIG. 6B, assigns new CID values cyclically. Preferably the CID values within the CID range are traversed in sequential order, and when the last CID value is reached the process starts all over again with the first CID value, for example 0, 1, 2, . . . , 127, 0, 1, 2, and so on. Naturally, the CID to be assigned next is stored in a NEXTCID register 60 for easy assignment to the relevant position in the intermediate memory. This results in the "oldest assigned" CID being selected for a packet belonging to a new packet stream. There is a fairly low probability that this CID is still active, and therefore this CID is a good candidate to be used when a new CID is to be assigned. If the lifetimes of all sessions are roughly the same, the "least recently used" algorithm and the "oldest assigned" algorithm are equally good.

Even when the lifetimes of the sessions differ from each other, the "oldest assigned" algorithm can be improved to almost match the "least recently used" algorithm with a simple addition. For each packet, the corresponding CID can be compared to the CID value to be assigned next (NEXTCID). If they match, the CID has been detected as active and the NEXTCID register 60 is stepped or incremented to take the value of the "next to oldest assigned" CID. This will reduce clashes in mixed traffic of long and short sessions.

When two routers that operate with different CID ranges are negotiating to determine which CID range to use in header compression, it is easy to select a given CID range by determining when the wrap-around in the cyclical assignment should take place. It is thus possible to traverse only a subset of the total CID range and start over from the beginning of the subset when the last CID in the subset is reached.

The "oldest assigned" algorithm is particularly suitable for hardware implementation.

In both algorithms, each location in the CID memory 40 can be initialized with any valid CID. For the "least recently used" algorithm, the CID list 50 can be initialized with CID values arranged in any arbitrary order.

CID Selection Based on the "Least Recently Used" Algorithm

Assuming that there exists a header compression implementation using simple direct hashing, the following resources are added:

An intermediate CID memory for storing CID numbers. The CID memory has a range that is a factor $f$ larger than the range of the real CID space.

A sorted CID list, logic for maintaining the sorted list as well as registers or equivalent pointing to the head and tail, respectively, of the list. The CID list has a range equal to the real CID range and contains all possible CID values.

A new type of field in the context memory (called the CID address field) for storing, for each header context in the context memory, the address (equal to the hash value) of the CID memory in which the corresponding CID is stored.

Logic for performing the necessary comparisons.

Figure 7:
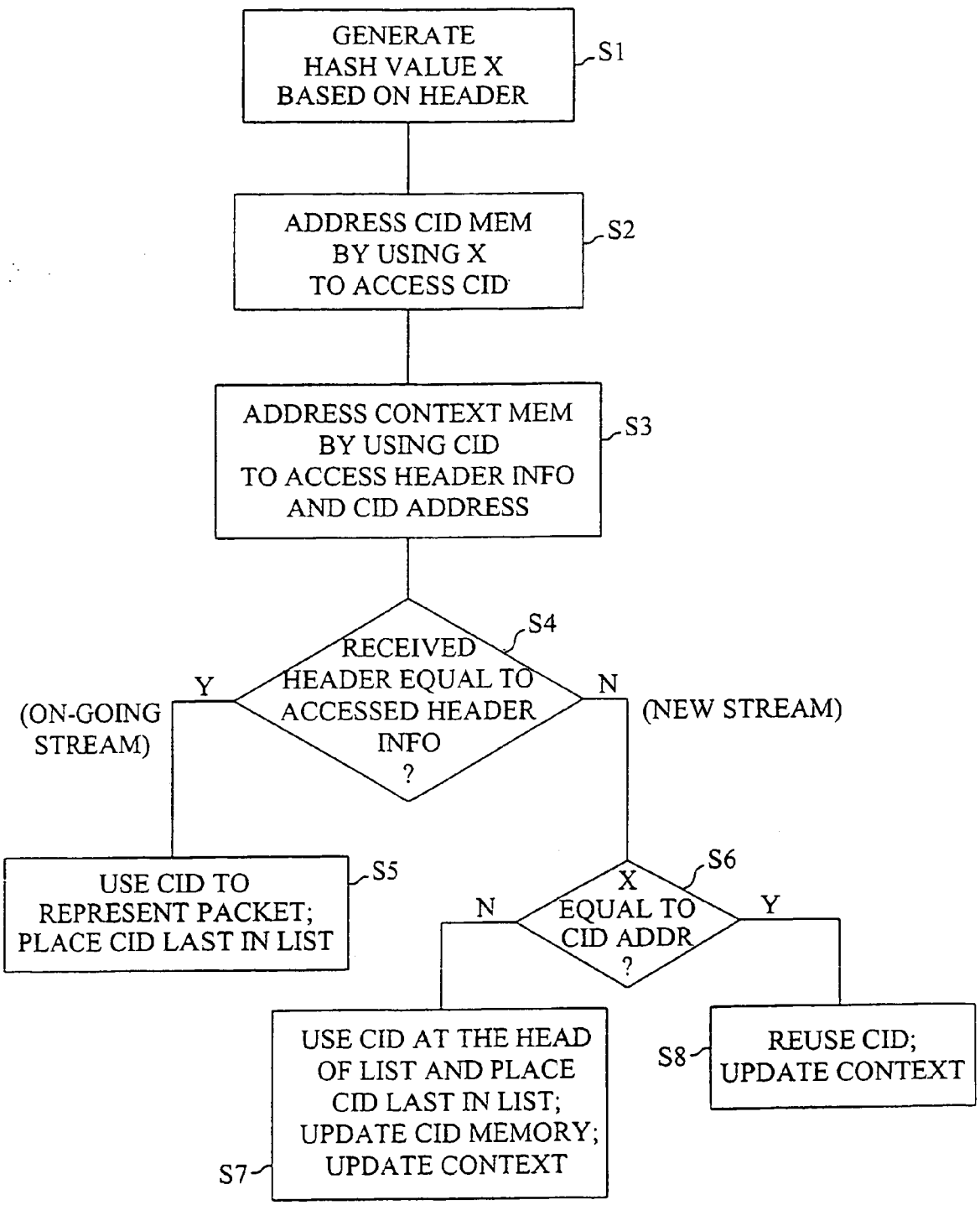
FIG. 7 is a schematic flow diagram of a CID selection method based on the "least recently used" algorithm according to a preferred embodiment of the invention.

The overall CID selection algorithm based on the "least recently used" algorithm will now be described with reference to the flow diagram of FIG. 7.

Perform the following steps for each packet:

S1: Generate a hash value X with a range $f$ times larger than the real CID range. The hash value is generally generated by a hashing method, applied to at least part of the packet header, preferably those fields that are classified as NO_CHANGE in header compression standards.

S2: Address the intermediate CID memory by using X to get a CID.

S3: Address the context memory by using the CID to get header information and the CID memory address (hash value) associated with the stored header information.

S4: Compare the header of the received packet with the header information accessed from the context memory.

S5: If they match (on-going packet stream), use the CID to represent the packet and place the CID at the end of the CID list.

S6: If they don't match (a new packet stream), compare X to the CID address in the relevant CID address field in the context memory.

S7: If X does not match the CID address (no clash in the virtual CID space), use the CID at the head of the CID list to represent the packet and place the CID last in the CID list. Update the CID memory by the new CID. Update the addressed position in the context memory by header information from the received packet and store the corresponding hash value X (the new CID address) calculated for that packet in the CID address field.

S8: If X matches the CID address (a clash in the virtual CID space), reuse the same CID for the new packet, and update the context memory with regard to header information as well as CID address.

If a certain CID is not used for a while (for example because the session to which the CID has been assigned no longer is active) the CID will successively move up in the CID list until it is at the head of the list at which time it will be taken by a new session.

CID Selection based on the "Oldest Assigned" Algorithm

In this embodiment, the following resources are added to an existing header compression implementation based on simple direct hashing:

An intermediate CID memory for storing CID numbers. The CID memory has range that is a factor $f$ larger than the range of the real CID space.

A register, referred to as the NEXTCID register, for holding the next CID to be assigned to a new stream.

A new type of field in the context memory (called the CID address field) for storing, for each header context in the context memory, the CID memory address (equal to the hash value) in which the corresponding CID is stored.

Simple logic for performing the necessary comparisons.

Figure 8:
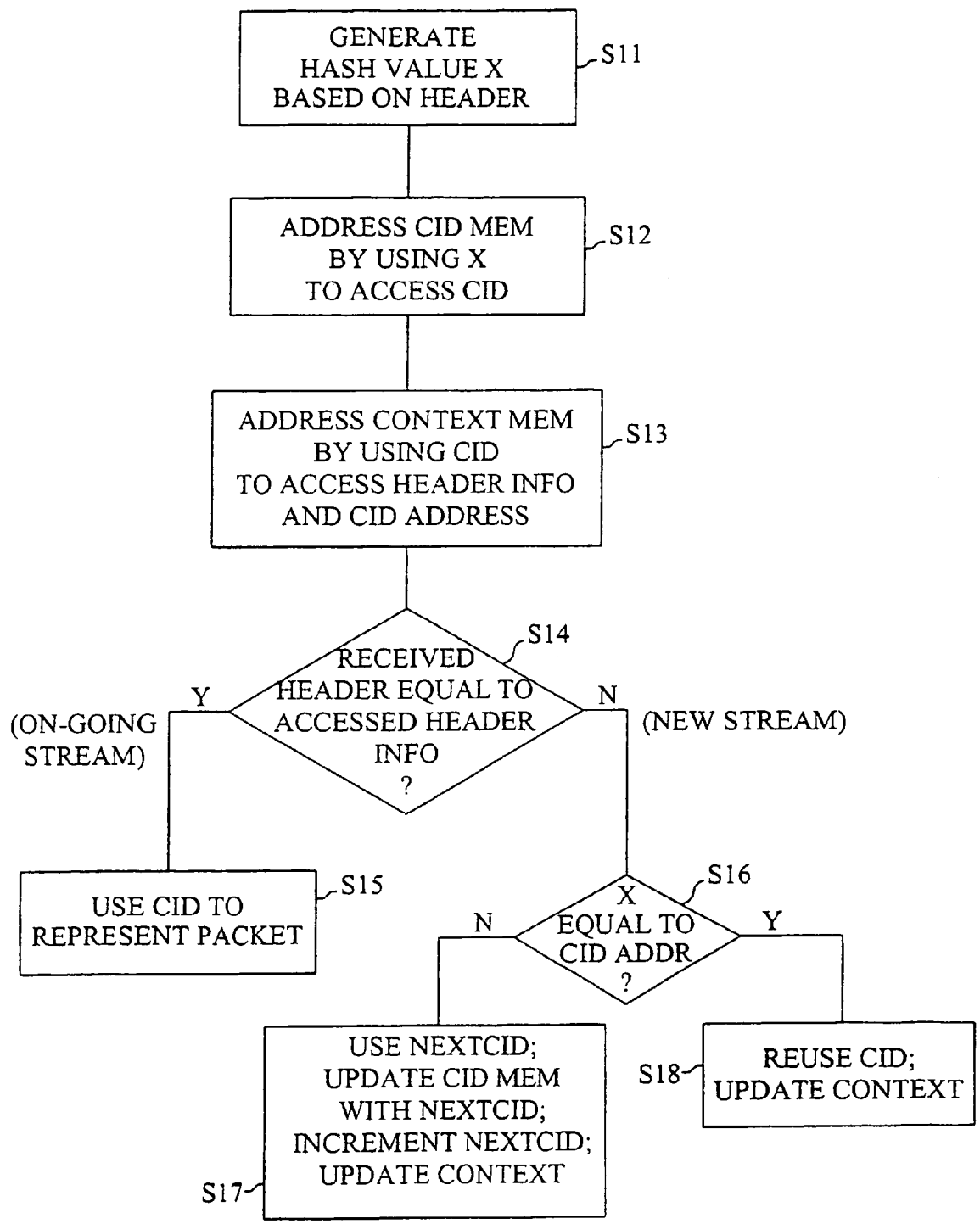
FIG. 8 is a schematic flow diagram of a CID selection method based on the "oldest assigned" algorithm according to a preferred embodiment of the invention.
Figure 9A:
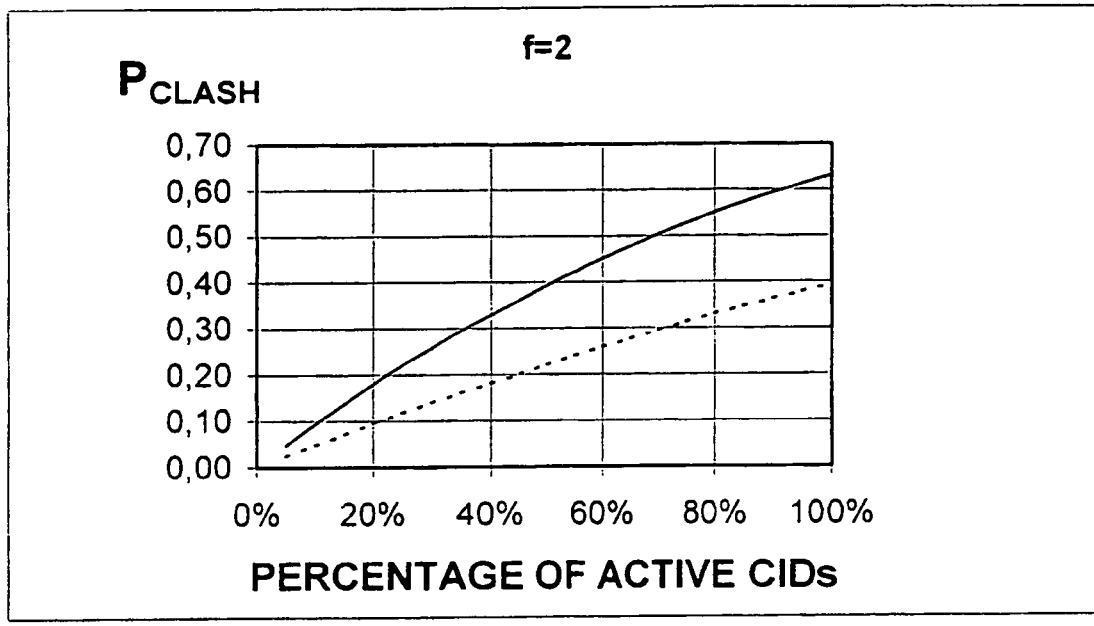
FIGS. 9A–D are schematic diagrams illustrating, for different values of $f$, the clashing probability as a function of the percentage of active CID values for a simple direct hashing algorithm on one hand and the extended CID generation algorithm of the invention on the other hand.
Figure 9B:
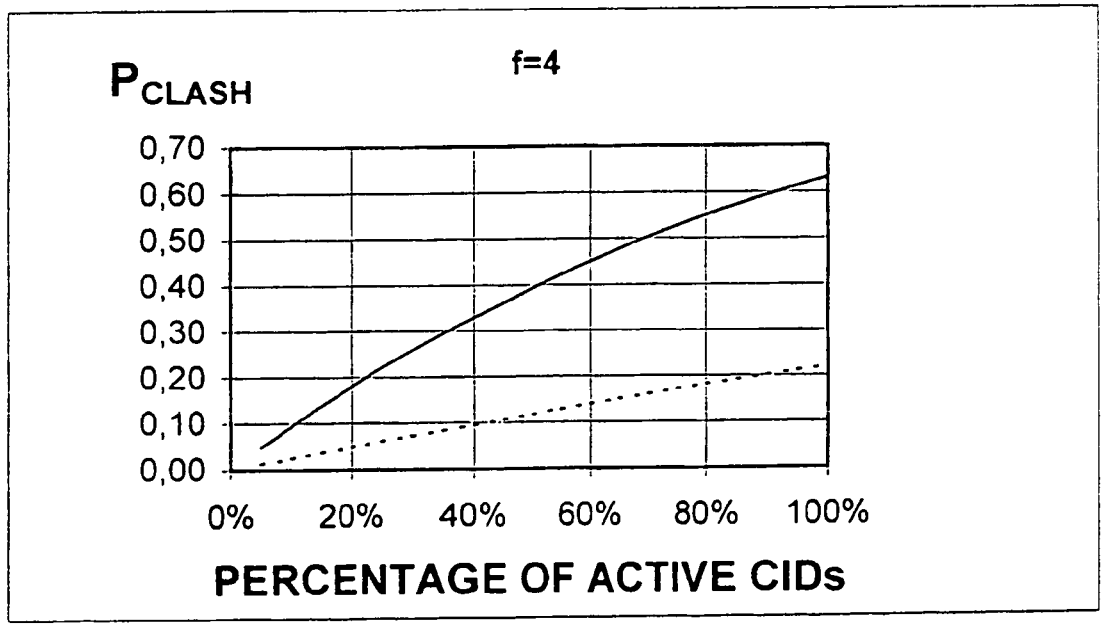
Figure 9C:
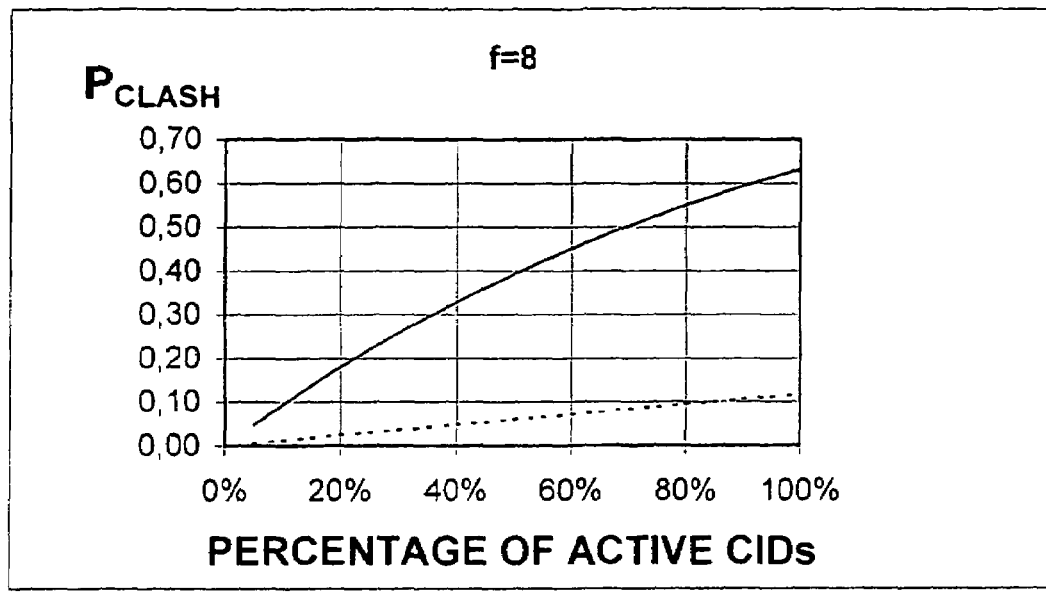
Figure 9D:
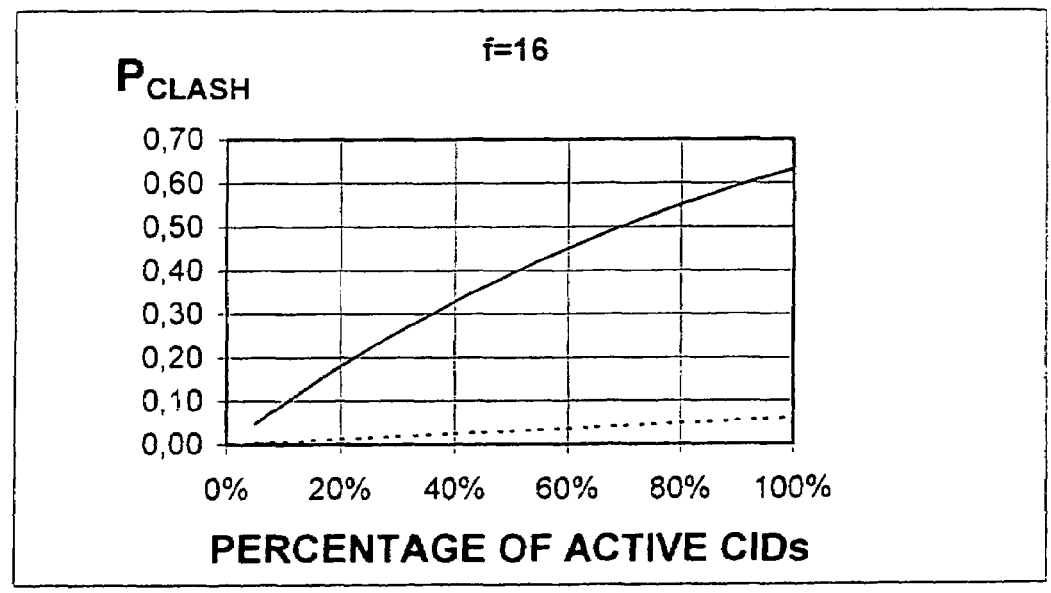

The overall CID selection algorithm based on the "oldest assigned" algorithm will now be described with reference to the flow diagram of FIG. 8.

Perform the following steps for each packet:

S11 to S14 correspond to S1 to S4.

S15: If they match (on-going packet stream), use the CID to represent the packet. If the next CID value is monitored for activity and the CID is equal to NEXTCID, increment NEXTCID.

S16: If they don't match (a new packet stream), compare the calculated hash value X to the CID address in the relevant CID address field in the context memory.

S17: If X does not match the CID address (no clash in the virtual CID space), use the CID value in the NEXTCID register to represent the packet, and update the CID memory by the CID from the NEXTCID register. Increment NEXTCID. Update the addressed position in context memory by the header of the received packet and store the corresponding hash value X (the new CID address) calculated for that packet in the CID address field.

S18: If X matches the CID address (a clash in the virtual CID space), reuse the same CID for the new packet, and update the context memory with regard to header information as well as CID address. If the next CID value is monitored for activity and the CID is equal to NEXTCID, increment NEXTCID.

Compared to simple hashing, the invention will significantly reduce the probability of different packet streams being mapped to the same CID. This leads to a considerable improvement of the compression rate and therefore better utilization of the available bandwidth of the links.

The efficiency of the invention has been investigated in connection with IP header compression, and an analysis is given in Appendix A.

For a more thorough understanding of how the invention can be applied to other hashing applications, the invention will now be described with reference to cache mapping in a computer system.

Cache Mapping in Computer Systems

In most modern computer systems, the main memories are often relatively slow with rather long access times and considered as the bottlenecks of the computer systems. In this context, it is important to keep in mind that faster memory components are generally much more expensive than the slower memory components used as main memories. A common way of alleviating this problem is to use one or more levels of small and fast cache as a buffer between the processor and the larger and slower main memory.

A cache memory contains copies of blocks of data/instructions that are stored in the main memory. In the cache, these blocks of data/instructions corresponds to cache line data fields. As reads to the main memory are issued in the computer system, the system first goes to the fast cache to determine if the information is present in the cache. If the information is available in the cache, a so-called cache hit, access to the main memory is not required and the required information is taken directly from the cache. If the information is not available in the cache, a so-called cache miss, the data is fetched from the main memory into the cache, possibly overwriting other active data in the cache. Similarly, as writes to the main memory are issued, data is written to the cache and copied back to the main memory. In most applications, the use of a cache memory speeds up the operation of the overall memory system significantly. The goal is to make the memory system appear to be as large as the main memory and as fast as the cache memory.

It has also been found useful to provide an extremely rapid cache directly on the processor chip. Such an on-chip cache is commonly referred to as a level 1 (L1) cache. Typically, there is also an off-chip cache, commonly referred to as a level 2 (L2) cache.

Figure 10:
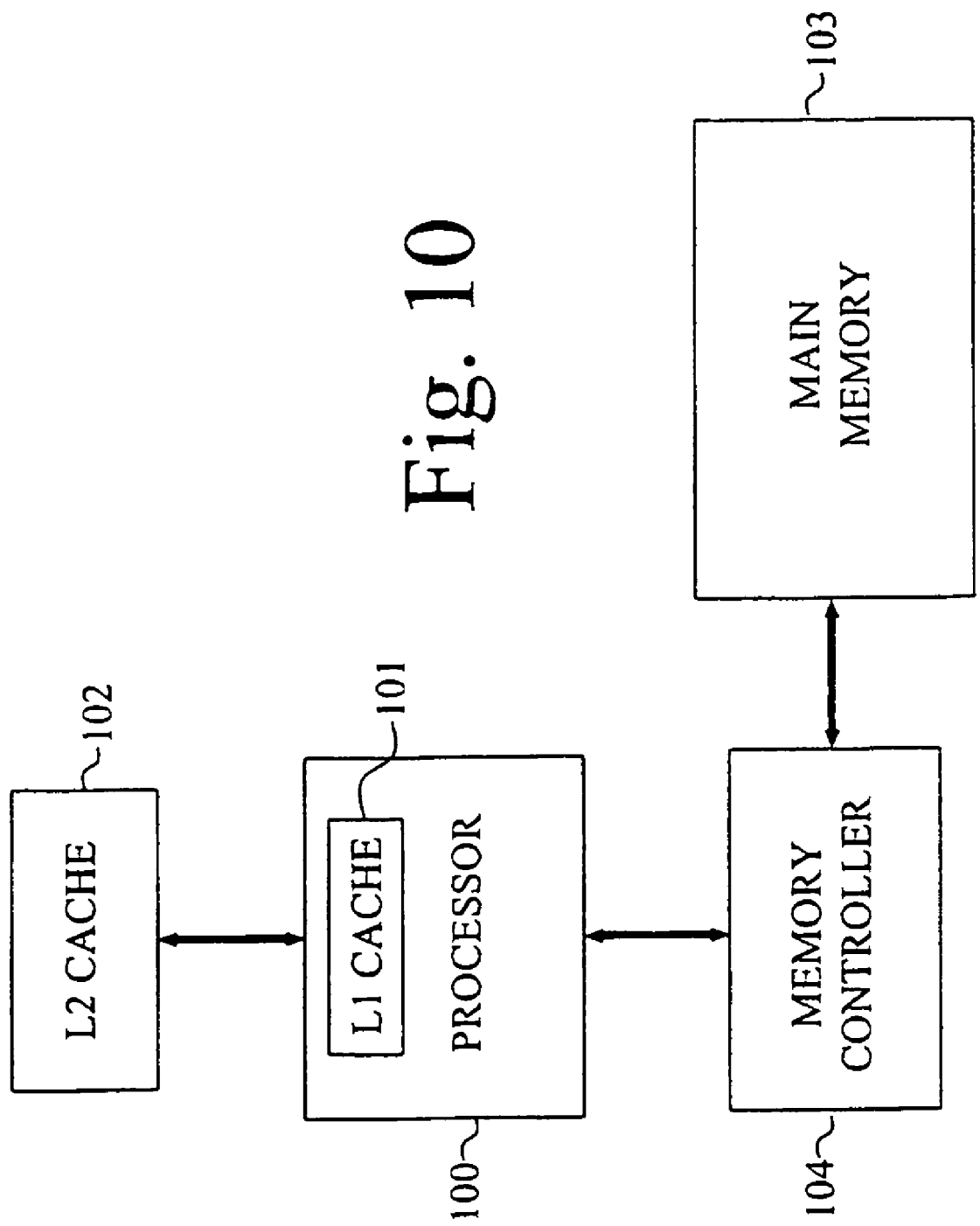
FIG. 10 is a schematic diagram illustrating a typical cache-based memory structure in a computer system.

FIG. 10 is a schematic diagram illustrating a typical cache-based memory structure in a computer system. The cache-based memory structure may be included in any general-purpose computer known to the art. As the skilled person will understand, the description is not intended to be complete with regard to the entire computer system, but concentrates on those parts that are relevant to the use of cache memories in computer systems.

In the particular example of FIG. 10, the computer system utilizes a typical two-level cache. The processor 100 is provided with an on-chip cache 101 (level 1 cache), and also connected to an off-chip cache 102 (level 2 cache). In this example, the off-chip cache 102 is connected to the processor 100 via a dedicated memory bus (including data, address and control bus). As most modern microprocessors, the processor 100 may have two caches on each level, one cache for data and another cache for instructions. For simplicity however, only a single cache is illustrated on each level. Further, the processor 100 is connected to a main memory 103, normally via a conventional memory controller 104. The caches 101, 102 are typically implemented using SRAMs (Static Random Access Memory) or similar high speed memory circuits, while the main memory 103 is typically implemented using slower DRAM (Dynamic Random Access Memory) circuits.

Of course, instead of the two-level cache of FIG. 10, it is possible to utilize a single-level cache system as well as a cache system with more than two levels.

Naturally, the processor includes functionality for controlling both the L1 and L2 cache memories. The performance of a cache is affected by the organization of the cache in general, and the placement algorithm in particular. The placement algorithm determines to which blocks or lines in the relevant cache that data in the main memory are mapped. The most commonly used algorithms are direct mapping, set-associative and fully associative mapping.

In direct mapping, which is the simplest scheme, a hash function (such as a conventional modulo function) is usually applied to the memory address to determine which cache line to use. With reference to Table I below, an example of an illustrative memory address is shown.

The most complex scheme, fully associative mapping, makes use of associative addressing that allows data from any address in the main memory to be placed in any block in the cache.

A set-associative cache lies between the two extremes of a direct mapped cache and a fully associative cache. In an n-way set-associative cache, the cache RAM is divided into n memory banks, or "ways". Each memory address maps to a certain location in any one of the n memory banks, and there is a choice of n memory banks for storage/retrieval of the actual data. A direct-mapped cache is a one-way set-associative cache.

Direct mapping in a cache memory is comparable to direct mapping in IP header compression. The physical location in the cache to which a memory address of the main memory is mapped to is generally determined by direct hashing from appropriate parts of the memory address, and there is normally a relatively high probability that several memory addresses map to the same cache location and therefore overwrite each other. This also holds true for n-way set-associative caches.

The use of an intermediate memory for emulating an extended larger virtual space of cache line identifiers can improve the mapping of direct-mapped and set-associative caches in the same way as the compression efficiency is improved in the IP header compression applications described above.

Emulating a Larger Virtual Cache-Line-Identifier Space in Cache Mapping

With reference to FIG. 11, a cache line selection mechanism according to a preferred embodiment of the invention will now be outlined.

It is assumed that a computer system is associated with a cache memory 101/102 of a limited size, say 4096 cache lines ranging from 0 to 4095. The corresponding cache line identifier (LID) values 0 to 4095 for addressing the cache memory define a LID space having a limited range of 4096. Logically, the cache memory is preferably organized in such a way that each cache line in the cache memory 101/102 includes a valid field (V), a tag field (TAG), an identifier address field (IDA) as well as a data field (DATA). The valid field indicates whether the data field contains valid information. The tag field contains the address information

TABLE I 32 bit memory address.

| 31 | 19 18 | 5 4 | 0 |
|---|---|---|---|
| Address info concerning which of a number of possible memory blocks that is mapped to the cache line | Cache line number | Byte offset | |

Assuming that the cache line is 32 bytes and the cache size is 16 kB, the five least significant bits 0 to 4 give the byte offset in the cache line data field. The next 14 bits 5 to 18 determine in which cache line the data must be stored. The remaining 13 bits 19 to 31 of redundant addressing implies that $2^{13}=8132$ possible memory blocks can be mapped to the same cache line. The cache has to store the address information in these bits as a tag in order to know which memory block that is currently stored there.

required to identify whether a word in the cache corresponds to a requested word. The IDA field corresponds to the CID address field in header compression applications, and the DATA field holds the relevant data/instructions. Of course, it is possible to find various different physical realizations of the above logical organization of the cache memory.

In clear contrast to conventional cache mapping based on direct hashing, the cache line selection mechanism according to the invention is based on an intermediate memory 140 of a range that is larger than the LID range. The intermediate memory 140 provides storage of cache line identifier values assigned from the real LID space, thereby emulating a larger virtual space of LID values. The virtual LID space is a factor $f$ larger than the real LID space, where $f$ is any real value larger than 1.

A hash coder 130 or any other equivalent module for implementing a suitable hash function calculates a bash value X, based on appropriate parts of a current address in the main memory. For example, the hash value may be calculated from the so-called cache line number part of the incoming memory address together with an appropriate number of bits from the so-called tag part of the memory address (see Table I). The calculated hash value X is used for addressing the intermediate memory 140 to get access to a LID. Compared to direct hashing from a memory address, the range of the hash values X used for addressing the intermediate memory 140 has to be larger than that of the LID values.

The intermediate memory 140 provides storage of LID values assigned from the real LID space allowing access to a LID when the intermediate memory is addressed by a hash value X. The accessed LID can then be used to access a cache line in the cache memory 101/102. Assuming that LID values are assigned from the real LID space to the intermediate memory 140 in an efficient manner, the extended virtual LID space gives essentially the same effect as an $f$ times larger real LID space.

In short, a hash value is calculated based on a memory address of interest. The hash value is utilized to address an intermediate memory in which the actual cache line address is stored. The tag part of the memory address is compared to stored tag information to determine if we have a cache hit or a cache miss. If they match, the data has been found. If not, we pick a new cache line. The selection of a new cache line can be done using the least recently used algorithm or the oldest assigned algorithm.

Handling Real Clashes in the Extended Virtual LID Space

In those cases when a perfect hash function can not be found, it is necessary to detect and handle clashes in the extended virtual identifier space to prevent the proposed cache line selection mechanism from degenerating. Preferably, each hash value is stored in relation to the corresponding tag information in the special IDA field in the cache memory 101/102 and compared to the hash value X leading to the clash. If they match, the cache line identified by the LID is updated, including updating the IDA field. This is consistent with using a real larger LID space with direct hashing and does not reduce the value of the algorithm according to the invention.

Depending on how the hash value is calculated from the incoming memory address, the memory address (in the form of the hash value) of the identifier in the intermediate memory may be deduced directly from the tag information. This means that the IDA field will become redundant, and may be removed.

Figure 13:
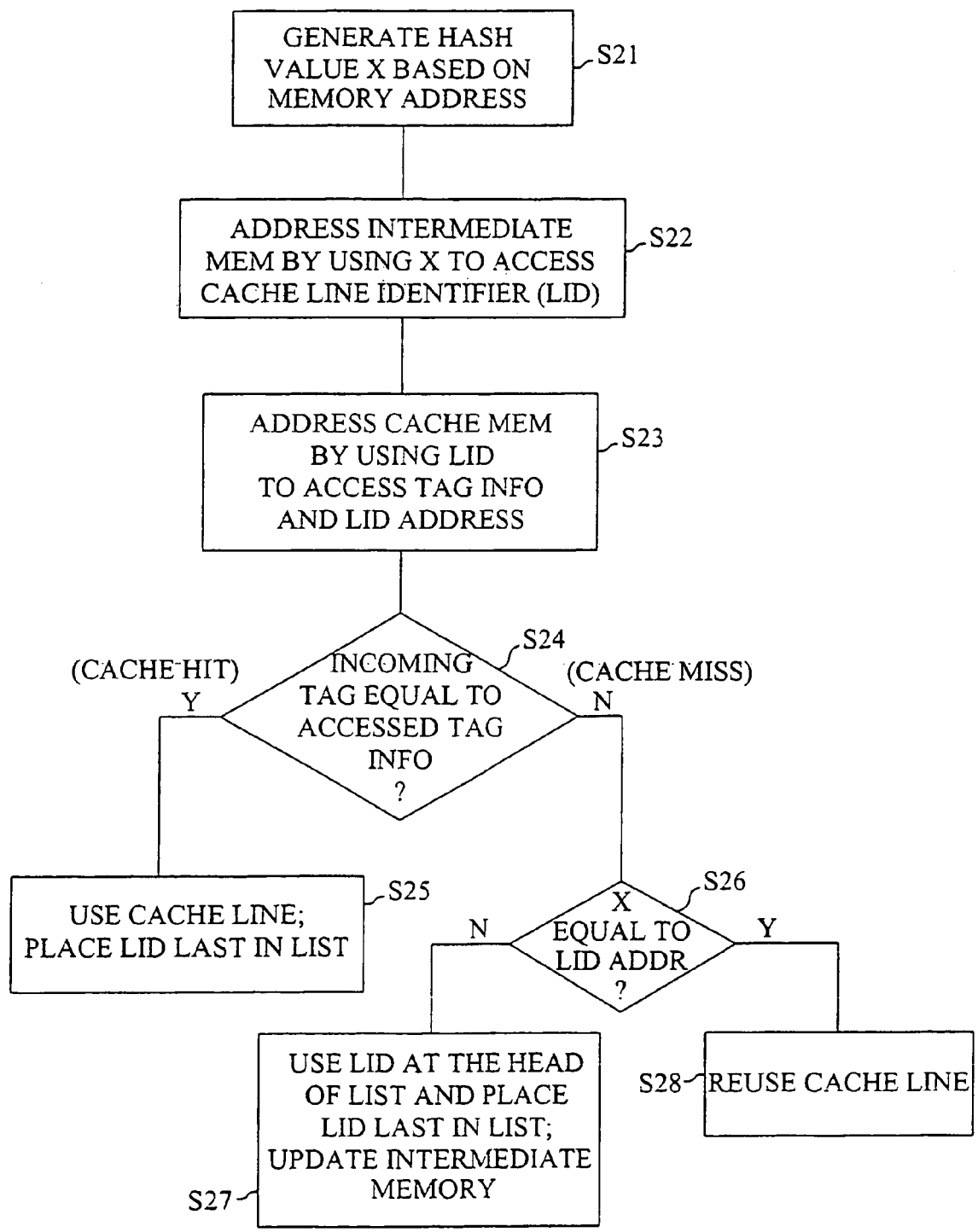
FIG. 13 is a schematic flow diagram of a cache line selection method based on the "least recently used" algorithm according to a preferred embodiment of the invention.
Figure 14:
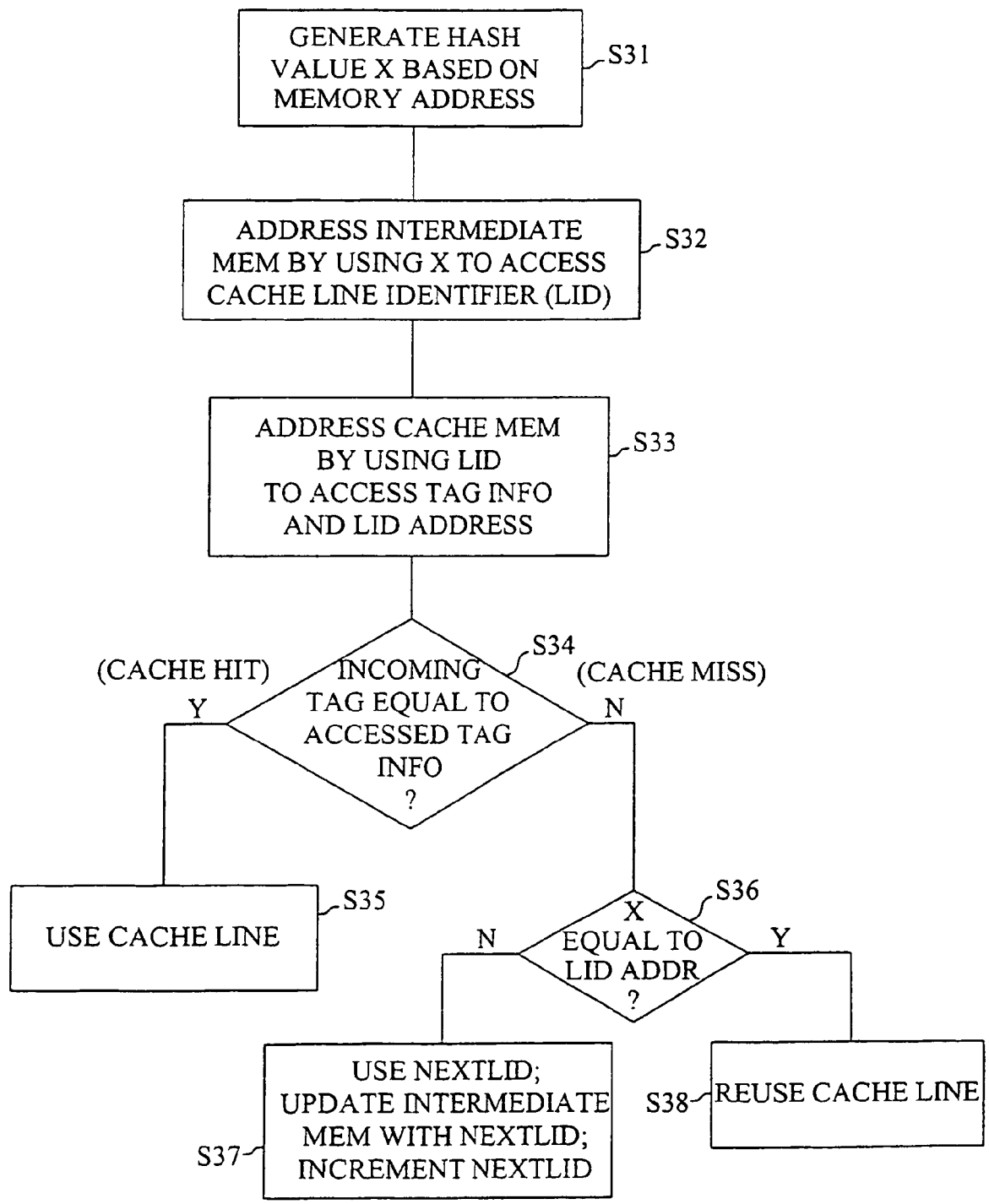
FIG. 14 is a schematic flow diagram of a cache line selection method based on the "oldest assigned" algorithm according to a preferred embodiment of the invention.

For completeness, the application of the "least recently used" algorithm and the "oldest assigned" algorithm to cache mapping will now be described with reference to the flow diagrams of FIG. 13 and FIG. 14, respectively.

Cache Line Selection Based on the "Least Recently Used" Algorithm

Assuming that there exists a cache implementation using direct mapping or set-associative mapping, the following resources are added:

An intermediate memory for storing cache line identifiers. The LID memory has a range that is a factor $f$ larger than the range of the real LID space.

A sorted list 150 (see FIG. 12A), logic for maintaining the sorted list as well as registers pointing to the head and tail, respectively, of the list. The list has a range equal to the real LID range and contains all possible LID values.

A new type of field in the cache memory (called the Identifier Address field) for storing, for each relevant memory address, the address (equal to the hash value) of the intermediate memory in which the corresponding LID is stored.

Logic for performing the necessary comparisons.

The overall cache line selection algorithm based on the "least recently used" algorithm will now be described with reference to the flow diagram of FIG. 13.

Perform the following steps for each main memory address of interest:

S21: Generate a hash value X. The hash value is generally generated by a hashing method applied to at least part of the incoming memory address.

S22: Address the intermediate LID memory by using X to get a LID.

S23: Address the cache memory by using the LID to access tag information and the LID address (hash value) associated with the stored tag information.

S24: Compare the tag of the memory address with the tag information accessed from the cache memory.

S25: If they match (cache hit), use the cache line and place the LID at the end of the list.

S26: If they don't match (a cache miss), compare X to the LID address in the relevant IDA field.

S27: If X does not match the LID address (no clash in the virtual LID space), use the LID at the head of the list and place the LID last in the list. Update the intermediate memory by the new LID.

S28: If X matches the LID address (a clash in the virtual LID space), reuse the cache line for the new memory address.

If a certain LID is not used for a while, that LID will successively move up in the list until it is at the head of the list.

Cache Line Selection Based on the "Oldest Assigned" Algorithm

Assuming that there exists a cache implementation using direct mapping or set-associative mapping, the following resources are added:

An intermediate memory for storing cache line identifiers. The LID memory has range that is a factor $f$ larger than the range of the real LID space.

A register, referred to as the NEXTLID register 160 (see FIG. 12B), for holding the next LID to be assigned.

A new type of field in the cache memory (called the Identifier Address field) for storing, for each relevant memory address, the address (equal to the hash value) of the intermediate memory in which the corresponding LID is stored.

Simple logic for performing the necessary comparisons.

The overall cache line selection mechanism based on the "oldest assigned" algorithm will now be described with reference to the flow diagram of FIG. 14.

Perform the following steps for each packet:

S31 to S34 correspond to S21 to S24.

S35: If they match (cache hit), use the cache line. If the next LID value is monitored for activity and the LID is equal to NEXTLID, increment NEXTLID.

S36: If they don't match (a cache miss), compare the calculated hash value X to the LID address in the relevant IDA field.

S37: If X does not match the LID address (no clash in the virtual LID space), use the LID value in the NEXTLID register, and update the intermediate memory by the LID from the NEXTLID register. Increment NEXTLID.

S38: If X matches the LID address (a clash in the virtual LID space), reuse the cache line for the new memory address.

For further information on cache memories, reference is made to *Computer Organization and Design: The Hardware/Software Interface* by Patterson and Hennessy, 2$^{nd}$ ed., Morgan Kaufmann Publishers, San Francisco, pp. 540–627.

As mentioned above, the proposed mapping mechanism is not limited to CID selection in IP header compression and cache mapping in computer systems but can also be applied to other hashing problems. Examples of other applications in which hashing can be improved by the invention include searching databases and performing various table lookups for IP routing.

The embodiments described above are merely given as examples, and it should be understood that the present invention is not limited thereto. Further modifications, changes and improvements which retain the basic underlying principles disclosed and claimed herein are within the scope and spirit of the invention.

APPENDIX A

Performance of CID Generation Based on Simple Direct Hashing

It is assumed that a simple hashing scheme is used for generating CID values, where C is the number of possible CID values (the maximum CID range) and S is the number of simultaneously active sessions.

To calculate the amount of packet streams that do not clash and therefore can be compressed, we first consider a single specific CID. The probability that exactly k sessions map to this CID is equal to:

$$p_c(k) = \left(\frac{1}{C}\right)^k \left(1 - \frac{1}{C}\right)^{S-k} \binom{S}{k} \quad (1)$$

The probability that exactly one session maps to this CID is therefore equal to:

$$p_c(1) = \frac{1}{C}\left(1 - \frac{1}{C}\right)^{S-1} S \quad (2)$$

The expected number of CID values that have exactly one session mapped to them is then equal to:

$$n(1) = p_c(1) \cdot C = \left(1 - \frac{1}{C}\right)^{S-1} S \quad (3)$$

The number of sessions that do not clash is equal to the number of CID values that only have one session mapped to them. Accordingly, the fraction of sessions that clash is equal to:

$$p_{clash} = 1 - \frac{n(1)}{S} = 1 - \left(1 - \frac{1}{C}\right)^{S-1} \quad (4)$$

Performance of CID Generation by Means of an Extended Virtual CID Space

The situation of having a virtual CID space, which is a factor $f$ larger than the real CID space C, can be modeled thinking of the number of possible CID values as effectively becoming $f$ times larger. For calculating the performance of the CID selection mechanism according to the invention, expression (4) above derived for direct hashing can be used with the number of possible CID values being equal to f·C (effectively replacing C by f·C).

Comparison

FIGS. 9A–D are schematic diagrams illustrating, for different values of $f$, the clashing probability as a function of the percentage ($\rho$) of active CID values for a simple direct hashing algorithm ($P_{direct}$) on one hand and the extended CID generation algorithm ($P_{extended}$) of the invention on the other hand. In FIGS. 9A–D, the clashing probability for the direct hashing algorithm is indicated by a solid line, whereas the clashing probability for the extended algorithm is indicated by a dashed line. In the given plots, C has been set to a typical value of 1024. As can be seen, the CID selection mechanism according to the invention outperforms the conventional direct hashing mechanism.

The invention claimed is:

1. A system for mapping signal elements to a first limited range of identifiers, comprising:
    an intermediate memory of a second larger range for storing identifiers assigned from the first limited range, thus emulating a larger virtual space of identifiers;
    a hash coder for calculating, for each one of a plurality of signal elements, a hash value based on at least part of the signal element for addressing the intermediate memory to access an identifier;
    means for detecting and handling a clash in the virtual space of identifiers including:
        means for detecting the mapping of a new signal element to the same identifier as a different and previously mapped signal element based on a comparison of the hash value associated with the new signal element and a hash value associated with the already mapped signal element; and
        means for using the identifier for the new signal element in response to detection of such a mapping.

2. The system according to claim 1, further comprising: means for cyclically assigning identifiers within the first limited range to the intermediate memory.

3. The system according to claim 1, wherein said signal elements are packet headers and said identifiers are context identifiers, and wherein the hash coder is configured to calculate the hash value based on at least one header field specified as no-change according to header compression standards.

4. The system according to claim 1, wherein said signal elements are memory addresses and said identifiers are cache line identifiers, and wherein the hash coder is configured to calculate the hash value based on at least part of the memory address.

5. A system for mapping packet streams to a first limited range of context identifiers, comprising:
    an intermediate memory of a second larger range for storing context identifiers assigned from the first limited range, thus emulating a larger virtual space of context identifiers;
    means for calculating, for each of a plurality of incoming packets, a hash value based on those parts of the packet header that do not change between successive packets in a packet stream for addressing the intermediate memory to access a context identifier, thereby reducing the risk for packet headers of different packet streams being mapped to the same context identifier, the system further comprising:

means for detecting and handling a clash in the virtual space of context identifiers including:

means for comparing, for an incoming packet belonging to a new packet stream, the calculated hash value for the incoming packet with a hash value associated with a header context stored in a context memory at a location corresponding to the context identifier accessed from the intermediate memory by means of the calculated hash value;

means for allowing, in response to a match in the comparison due to clashing, the context identifier accessed from the intermediate memory to represent the new packet stream; and means for updating the context memory by storing the context-forming part of the packet header of the incoming packet at a location corresponding to the accessed context identifier, and for associating the corresponding hash value with the stored header context.

6. The system according to claim 5, further comprising:

means for updating, in response to a mismatch in the comparison, the accessed context identifier in the intermediate memory by the oldest assigned context identifier; and means for allowing, in response to a mismatch in the comparison, the oldest assigned context identifier to represent the packet header and the corresponding packet stream.

7. The system according to claim 5, further comprising:

means for cyclically assigning context identifiers within the first limited range to the intermediate memory to represent new packet streams.

8. The system according to claim 7, further comprising:

means for skipping a context identifier in the cyclic assignment of context identifiers if the context identifier is detected as active.

9. The system according to claim 5, further comprising:

means for updating, in response to a mismatch in the comparison, the accessed context identifier in the intermediate memory by the least recently used context identifier; and means for allowing, in response to a mismatch in the comparison, the least recently used context identifier to represent the packet header and the corresponding packet stream.

10. The system according to claim 9, further comprising:

means for arranging context identifiers within the first limited range in a sorted list according to their use for representing packet streams with the most recently used context identifiers at the end of the list, wherein the context identifier at the head of the list is used as the least recently used context identifier.

11. The system according to claim 5, further comprising:

means for assigning the least recently used context identifier to the intermediate memory to represent a packet belonging to a new packet stream.

12. A system for mapping packet streams to a first limited range of context identifiers, comprising:

an intermediate memory of a second larger range for storing context identifiers assigned from the first limited range, thus emulating a larger virtual space of context identifiers;

means for calculating, for each of a plurality of incoming packets, a hash value based on those parts of the packet header that do not change between successive packets in a packet stream for addressing the intermediate memory to access a context identifier, thereby reducing the risk for packet headers of different packet streams being mapped to the same context identifier, the system further comprising:

means for addressing a context memory based on the accessed context identifier to obtain a corresponding header context;

means for performing a comparison between the context-forming part of the current packet header and the obtained header context;

means for, in response to a match in the comparison, allowing the context identifier to represent the packet header and the corresponding packet stream;

means for, in response to a mismatch in the comparison:

performing a further comparison between the calculated hash value of the current packet header and a hash value associated with the obtained header context in the context memory; and in response to a match in the further comparison due to clashing, allowing the accessed context identifier to represent the packet header and the corresponding packet stream;

in response to a mismatch in the further comparison, updating the accessed context identifier in the intermediate memory by the oldest assigned context identifier or the least recently used context identifier, allowing this context identifier to represent the packet header and the corresponding packet stream; and updating the context memory by storing the context-forming part of the current packet header at the memory location corresponding to the context identifier allowed to represent the packet header, and associating the corresponding hash value with the context-forming header part.

13. A system for mapping memory addresses to a first limited range of cache line identifiers, comprising:

an intermediate memory of a second larger range for storing cache line identifiers assigned from the first limited range, thus emulating a larger virtual space of cache line identifiers;

means for calculating, for each of said memory addresses, a hash value based on at least part of the memory address for addressing the intermediate memory to access a cache line identifier, thereby reducing the risk for different memory addresses being mapped to the same cache line identifier, the system further comprising:

means for obtaining tag information from a cache memory line identified by the accessed cache line identifier;

means for performing a comparison between the tag of the memory address and the obtained tag information;

means for, in response to a match in the comparison, allowing access to the cache memory line identified by the accessed cache line identifier;

means for, in response to a mismatch in the comparison:

performing a further comparison between the calculated hash value of the memory address and a hash value associated with the obtained tag information; and in response to a match in the further comparison due to clashing, allowing access to the cache memory line identified by the accessed cache line identifier;

in response to a mismatch in the further comparison, updating the accessed cache line identifier in the intermediate memory by the oldest assigned cache line identifier or the least recently used cache line identifier, allowing access to the cache memory line identified by this cache line identifier; and updating the accessed cache memory line by storing the tag of the memory address, and associating the corresponding hash value to the stored tag.

14. The system according to claim 13, further comprising: means for detecting and handling a clash in the virtual space of cache line identifiers.

15. The system according to claim 14, wherein said clash detecting and handling means comprises:
means for comparing, for a new memory address, the calculated hash value of the memory address with a hash value associated with a tag stored in a cache memory line that corresponds to the cache line identifier accessed from the intermediate memory by means of the calculated hash value;
means for allowing, in response to a match in the comparison due to clashing, access to the cache memory line identified by the accessed cache line identifier; and
means for updating the cache memory line identified by the accessed cache line identifier by storing the tag of the new memory address, and for associating the corresponding hash value to the stored tag.

16. The system according to claim 15, further comprising:
means for updating, in response to a mismatch in the comparison, the accessed cache line identifier in the intermediate memory by the oldest assigned cache line identifier; and
means for allowing, in response to a mismatch in the comparison, access to the cache memory line identified by the oldest assigned cache line identifier.

17. The system according to claim 15, further comprising:
means for updating, in response to a mismatch in the comparison, the accessed cache line identifier in the intermediate memory by the least recently used cache line identifier; and
means for allowing, in response to a mismatch in the comparison, access to the cache memory line identified by the least recently used cache line identifier.

18. The system according to claim 17, further comprising:
means for arranging cache line identifiers within the first limited range in a sorted list according to their use, with the most recently used cache line identifiers at the end of the list, wherein the cache line identifier at the head of the list is used as the least recently used cache line identifier.

19. The system according to claim 13, further comprising:
means for cyclically assigning cache line identifiers within the first limited range to the intermediate memory.

20. The system according to claim 19, further comprising:
means for skipping a cache line identifier in the cyclic assignment of cache line identifiers if the cache line identifier is detected as active.

21. The system according to claim 13, further comprising:
means for assigning the least recently used cache line identifier to the intermediate memory to allow access to the corresponding cache memory line.

22. A method for mapping signal elements to a first limited range of identifiers, comprising:
assigning identifiers within the first limited range to an intermediate memory of a second larger range, thus emulating a larger virtual space of identifiers;
calculating, for each one of a plurality of signal elements, a hash value based on at least part of the signal element for addressing the intermediate memory to access an identifier,
thereby reducing the risk for different signal elements being mapped to the same identifier, the method further comprising:
detecting and handling a clash in the virtual space of identifiers including:
detecting the mapping of a new signal element to the same identifier as a different and previously mapped signal element based on a comparison of the hash value associated with the new signal element and a hash value associated with the already mapped signal element; and
using the identifier for the new signal element in response to detection of such a mapping.

23. The method according to claim 22, wherein identifiers within the first limited range are cyclically assigned to the intermediate memory.

24. The method according to claim 22, wherein said signal elements are packet headers and said identifiers are context identifiers, and the hash value is calculated based on at least one header field specified as no-change according to header compression standards.

25. The method according to claim 22, wherein said signal elements are memory addresses and said identifiers are cache line identifiers, and the hash value is calculated based on at least part of the memory address.

26. A method for mapping packet streams to a first limited range of context identifiers, comprising:
assigning context identifiers within the first limited range to an intermediate memory of a second larger range, thus emulating a larger virtual space of context identifiers;
calculating, for each of a plurality of incoming packets, a hash value based on those parts of the packet header that do not change between successive packets in a packet stream for addressing the intermediate memory to access a context identifier,
thereby reducing the risk for packet headers of different packet streams being mapped to the same context identifier, the method further comprising:
detecting and handling a clash in the virtual space of context identifiers including:
comparing, for an incoming packet belonging to a new packet stream, the calculated hash value for the incoming packet with a hash value associated with a header context stored in a context memory at a location corresponding to the context identifier accessed from the intermediate memory by means of the calculated hash value;
allowing, in response to a match in the comparison due to clashing, the context identifier accessed from the intermediate memory to represent the incoming packet and the new packet stream; and
updating the context memory by storing the context-forming part of the packet header of the incoming packet at the location corresponding to the accessed context identifier, and associating the corresponding hash value with the stored header context.

27. The method according to claim 26, wherein updating, in response to a mismatch in the comparison, the accessed context identifier in the intermediate memory by the oldest assigned context identifier, allowing the oldest assigned context identifier to represent the incoming packet header.

28. The method according to claim 26, wherein context identifiers within the first limited range are cyclically assigned to the intermediate memory to represent new packet streams.

29. The method according to claim 28, further comprising:
skipping a context identifier in the cyclic assignment of context identifiers if the context identifier is detected as active.

30. The method according to claim 26, further comprising:
updating, in response to a mismatch in the comparison, the accessed context identifier in the intermediate memory by the least recently used context identifier, allowing this context identifier to represent the packet header.

31. The method according to claim 30, further comprising:
arranging context identifiers within the first limited range in a sorted list according to their use for representing packet streams with the most recently used context identifiers at the end of the list, wherein the context identifier at the head of the list is used as the least recently used context identifier.

32. The method according to claim 26, further comprising:
assigning the least recently used context identifier to the intermediate memory to represent a packet belonging to a new packet stream.

33. A method for mapping memory addresses to a first limited range of cache line identifiers, comprising:
assigning cache line identifiers within the first limited range to an intermediate memory of a second larger range, thus emulating a larger virtual space of cache line identifiers;
calculating, for each of said memory addresses, a hash value based on at least part of the memory address for addressing the intermediate memory to access a cache line identifier,
thereby reducing the risk for different memory addresses being mapped to the same cache line identifier, the method further comprising:
detecting and handling a clash in the virtual space of cache line identifiers including:
comparing, for a new memory address, the calculated hash value of the memory address with a hash value associated with a tag stored in a cache memory line that corresponds to the cache line identifier accessed from the intermediate memory (140) by means of the calculated hash value;
allowing, in response to a match in the comparison due to clashing, access to the cache memory line identified by the accessed cache line identifier; and
updating the cache memory line identified by the accessed cache line identifier by storing the tag of the new memory address, and for associating the corresponding hash value to the stored tag.

34. The method according to claim 33, further comprising:
updating, in response to a mismatch in the comparison, the accessed cache line identifier in the intermediate memory by the oldest assigned cache line identifier, allowing access to the cache memory line identified by the oldest assigned cache line identifier.

35. The method according to claim 33, wherein cache line identifiers within the first limited range are cyclically assigned to the intermediate memory.

36. The method according to claim 35, further comprising:
skipping a cache line identifier in the cyclic assignment of cache line identifiers if the cache line identifier is detected as active.

37. The method according to claim 33, further comprising:
updating, in response to a mismatch in the comparison, the accessed cache line identifier in the intermediate memory by the least recently used cache line identifier, allowing access to the cache memory line identified by this cache line identifier.

38. The method according to claim 37, further comprising:
arranging cache line identifiers within the first limited range in a sorted list according to their use, with the most recently used cache line identifiers at the end of the list, wherein the cache line identifier at the head of the list is used as the least recently used cache line identifier.

39. The method according to claim 33, further comprising:
assigning the least recently used cache line identifier to the intermediate memory to allow access to the corresponding cache memory line.

* * * * *

UNITED STATES PATENT AND TRADEMARK OFFICE
CERTIFICATE OF CORRECTION

PATENT NO. : 7,197,622 B2  Page 1 of 1
APPLICATION NO. : 10/450827
DATED : March 27, 2007
INVENTOR(S) : Kjell Torkelsson et al.

It is certified that error appears in the above-identified patent and that said Letters Patent is hereby corrected as shown below:

In Column 7, Line 5, delete "CD" and insert -- CID --, therefor.
(CERTIFIED COPY OF FOREIGN PRIORITY APPLICATION DATED JUNE 18, 2003, PAGE 12, LINE 19)

In Column 7, Line 65, delete "CTD" and insert -- CID --, therefor.
(INTERNATIONAL PUBLISHED APPLICATION, IN THE SPECIFICATION DATED JUNE 18, 2003, PAGE 14, LINE 9)

In Column 13, Line 8, delete "bash" and insert -- hash --, therefor.
(INTERNATIONAL PUBLISHED APPLICATION, IN THE SPECIFICATION DATED JUNE 18, 2003, PAGE 24, LINE 6)

Signed and Sealed this

Thirtieth Day of June, 2009

JOHN DOLL
*Acting Director of the United States Patent and Trademark Office*